United States Patent
Omura

(10) Patent No.: US 12,394,847 B2
(45) Date of Patent: Aug. 19, 2025

(54) POWER STORAGE DEVICE AND VEHICLE-MOUNTED STRUCTURE THEREOF

(71) Applicant: PRIME PLANET ENERGY & SOLUTIONS, INC., Tokyo (JP)

(72) Inventor: Tetsuji Omura, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 512 days.

(21) Appl. No.: 17/858,479

(22) Filed: Jul. 6, 2022

(65) Prior Publication Data
US 2023/0024125 A1 Jan. 26, 2023

(30) Foreign Application Priority Data
Jul. 14, 2021 (JP) .................. 2021-116421

(51) Int. Cl.
*H01M 50/204* (2021.01)
*H01M 50/249* (2021.01)
*H01M 50/264* (2021.01)

(52) U.S. Cl.
CPC ....... *H01M 50/204* (2021.01); *H01M 50/249* (2021.01); *H01M 50/264* (2021.01); *H01M 2220/20* (2013.01)

(58) Field of Classification Search
CPC ............. H01M 50/204; H01M 50/249; H01M 50/264; H01M 2220/20
See application file for complete search history.

(56) References Cited

U.S. PATENT DOCUMENTS

| | | | |
|---|---|---|---|
| 2014/0087228 A1* | 3/2014 | Fabian | H01M 50/204 429/99 |
| 2015/0037633 A1* | 2/2015 | Akiyama | H01M 50/289 429/83 |
| 2016/0218329 A1 | 7/2016 | Ueda et al. | |
| 2017/0187016 A1* | 6/2017 | Nagasato | H01M 50/545 |
| 2019/0081307 A1* | 3/2019 | Fukushima | H01M 50/50 |
| 2019/0267603 A1* | 8/2019 | Chi | H01M 50/505 |
| 2020/0076023 A1* | 3/2020 | Puckett | F28F 3/12 |
| 2020/0127257 A1 | 4/2020 | Lee et al. | |
| 2020/0212385 A1 | 7/2020 | Shi et al. | |
| 2020/0365850 A1* | 11/2020 | Shinoda | H01M 10/6567 |

(Continued)

FOREIGN PATENT DOCUMENTS

| | | |
|---|---|---|
| JP | 2012-101663 A | 5/2012 |
| JP | 2016-132314 A | 7/2016 |

(Continued)

*Primary Examiner* — Nicholas A Smith
*Assistant Examiner* — Benjamin Eli Kass-Mullet
(74) *Attorney, Agent, or Firm* — Finnegan, Henderson, Farabow, Garrett and Dunner, LLP

(57) ABSTRACT

A power storage device includes: a first case that accommodates a plurality of stacked first power storage cells; and a second case that accommodates a plurality of stacked second power storage cells. The first case has a first reinforcement portion extending in a first direction, and the second case has a second reinforcement portion extending in a second direction intersecting the first direction. The first case and the second case are provided to overlap with each other along a third direction intersecting the first direction and the second direction, and are joined to each other.

14 Claims, 14 Drawing Sheets

(56) References Cited

U.S. PATENT DOCUMENTS

| | | | |
|---|---|---|---|
| 2021/0276405 A1* | 9/2021 | Okada | H01M 10/625 |
| 2021/0296728 A1 | 9/2021 | Kim et al. | |
| 2021/0351455 A1* | 11/2021 | Kim | B60L 50/66 |
| 2022/0255172 A1* | 8/2022 | Guo | H01M 50/262 |
| 2022/0344759 A1* | 10/2022 | Choi | B60L 50/64 |
| 2022/0367965 A1* | 11/2022 | Pan | H01M 50/548 |
| 2022/0384893 A1* | 12/2022 | Schneider | H01M 50/242 |

FOREIGN PATENT DOCUMENTS

| | | |
|---|---|---|
| KR | 10-2016-0057387 A | 6/2016 |
| KR | 10-2020-0033779 A | 3/2020 |
| WO | WO 2021-083062 A1 | 5/2021 |

* cited by examiner

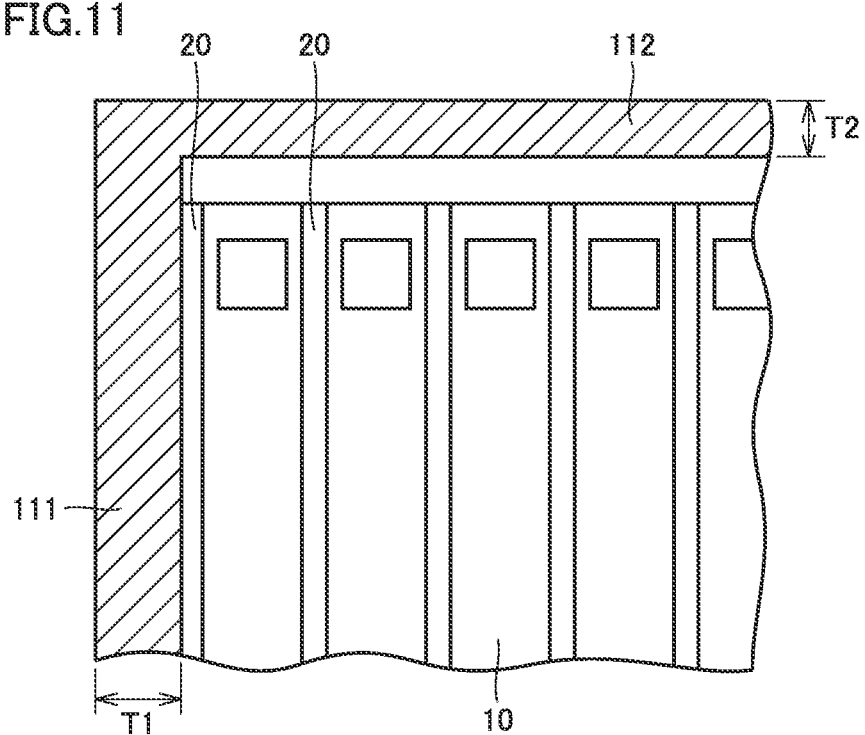
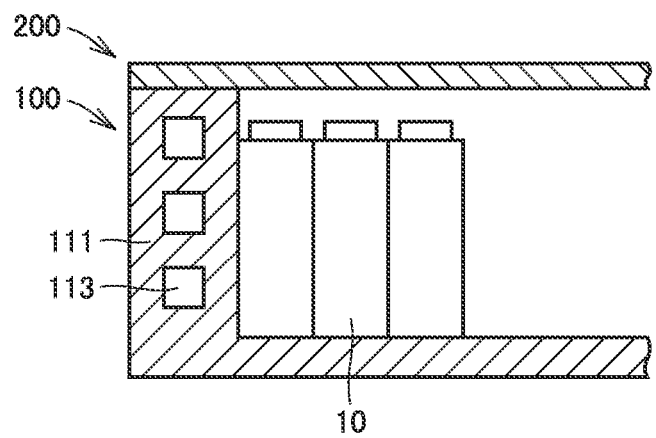

POWER STORAGE DEVICE AND
VEHICLE-MOUNTED STRUCTURE
THEREOF

This nonprovisional application is based on Japanese Patent Application No. 2021116421 filed on Jul. 14, 2021 with the Japan Patent Office, the entire contents of which are hereby incorporated by reference.

BACKGROUND OF THE INVENTION

Field of the Invention

The present technology relates to a power storage device and a vehicle-mounted structure thereof.

Description of the Background Art

An exemplary vehicle-mounted structure of a power storage device (battery pack) is described in each of Japanese Patent Laving-Open No. 2012-101663 and Japanese Patent Laying-Open No. 2016-132314.

It is required to improve vibration resistance of a power storage device. On the other hand, when a reinforcement structure for improving the vibration resistance is provided, efficiency of accommodating cells in a case may be decreased. As a result, the size of the power storage device becomes large which leads to such a concern that energy density is also decreased. The conventional reinforcement structure is not necessarily sufficient to overcome the above concern.

SUMMARY OF THE INVENTION

An object of the present technology is to provide a power storage device and a vehicle-mounted structure thereof so as to attain improved energy density, reduced size, and improved vibration resistance.

A power storage device according to the present technology includes: a first case that accommodates a plurality of stacked first power storage cells; and a second case that accommodates a plurality of stacked second power storage cells. The first case has a first reinforcement portion extending in a first direction, and the second case has a second reinforcement portion extending in a second direction intersecting the first direction. The first case and the second case are provided to overlap with each other along a third direction intersecting the first direction and the second direction, and are joined to each other.

The foregoing and other objects, features, aspects and advantages of the present invention will become more apparent from the following detailed description of the present invention when taken in conjunction with the accompanying drawings.

Figure 1:
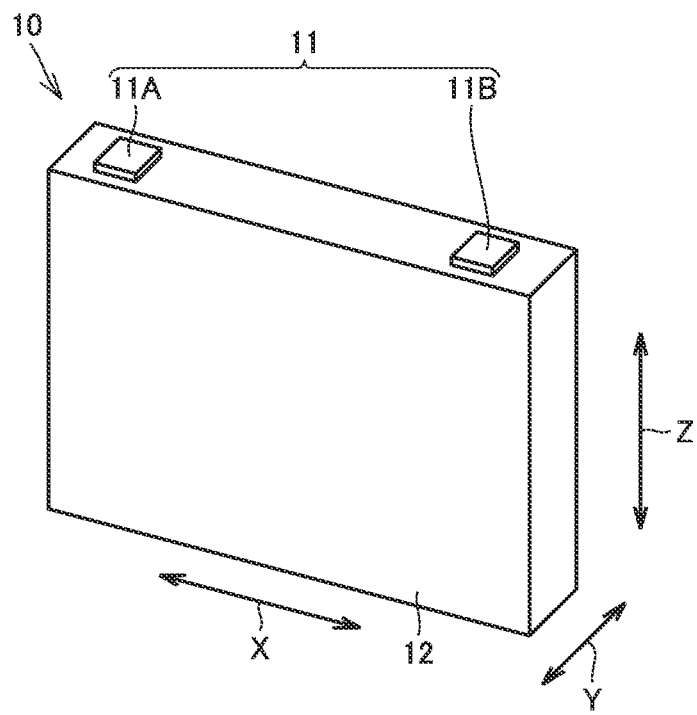
FIG. 1 is a diagram showing a battery cell.

DESCRIPTION OF THE PREFERRED
EMBODIMENTS

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial" and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

In the present specification, when the term "power storage cell" or "power storage device" is used, the "power storage cell" or "power storage device" is not limited to a battery cell or a battery module, and may include, for example, a capacitor.

FIG. 1 is a diagram showing a battery cell 10. As shown in FIG. 1, battery cell 10 is formed to have a substantially rectangular parallelepiped shape with a flat surface. Battery cells 10 are stacked in a Y axis direction. An electrode terminal 11 includes a positive electrode terminal 11A and a negative electrode terminal 11B. Positive electrode terminal 11A and negative electrode terminal 11B are arranged side by side in an X axis direction. Electrode terminal 11 is provided on the upper surface of a housing 12 having a prismatic shape. Each of the upper surface and bottom surface of housing 12 has a substantially rectangular shape in which the X axis direction corresponds to the long side direction and the Y axis direction corresponds to the short side direction. An electrode assembly and an electrolyte solution are accommodated in housing 12.

First Embodiment

Figure 2:
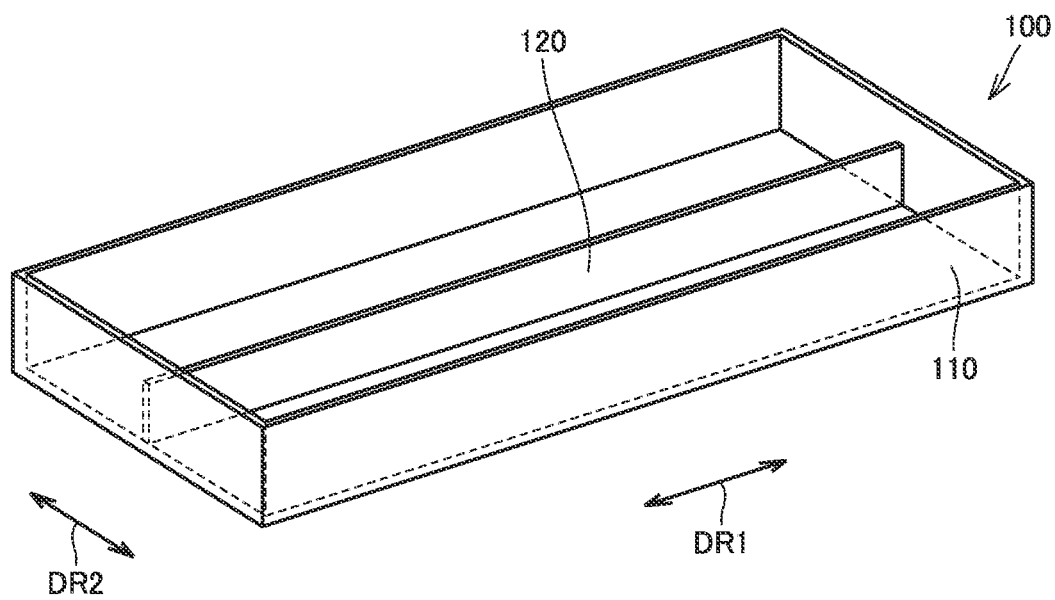
FIG. 2 is a perspective view showing a first case of a battery pack according to a first embodiment.
Figure 3:
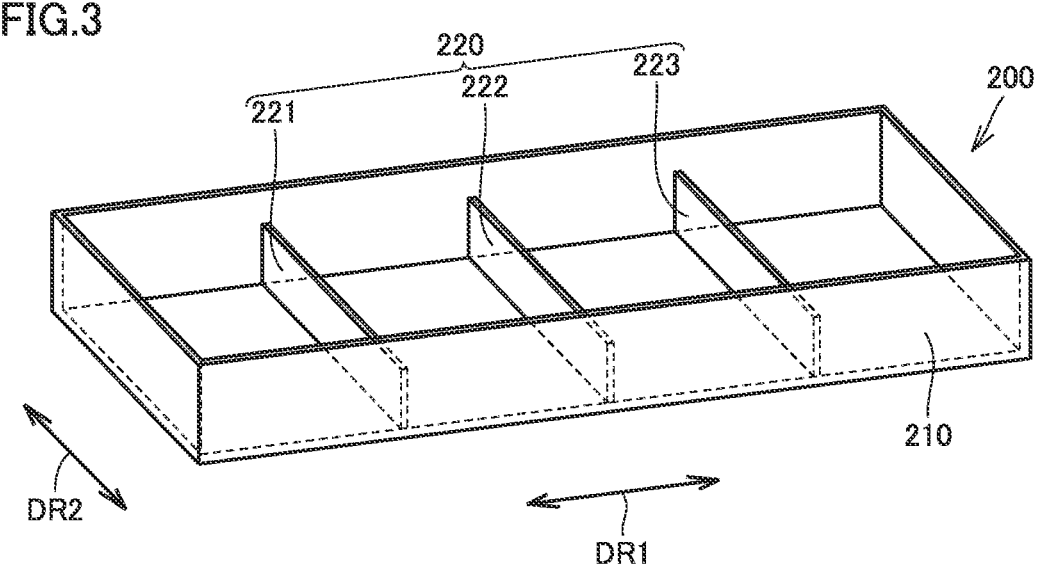
FIG. 3 is a perspective view showing a second case of the battery pack according to the first embodiment.

FIGS. 2 and 3 are perspective views respectively showing a first case 100 and a second case 200 of a battery pack according to a first embodiment.

As shown in FIG. 2, first case 100 has a main body 110 and a rib 120 (first reinforcement portion) extending in a DR1 direction (first direction). Rib 120 is provided to protrude from the bottom surface (first bottom surface) of main body 110 of first case 100. Rib 120 extends along the DR1 direction across a whole of first case 100 in the width direction of first case 100.

As shown in FIG. 3, second case 200 has a rib 220 (second reinforcement portion) extending in a DR2 direction substantially orthogonal to (intersecting) the DR1 direction. It is not necessarily limited that the DR1 direction and the DR2 direction intersect each other orthogonally. Rib 220 is provided to protrude from the bottom surface (second bottom surface) of a main body 210 of second case 200, Rib 220 extends along the DR2 direction across a whole of second case 200 in the width direction of second case 200. Rib 220 includes three ribs 221, 222, 223 provided side by side in the DR1 direction.

Figure 4:
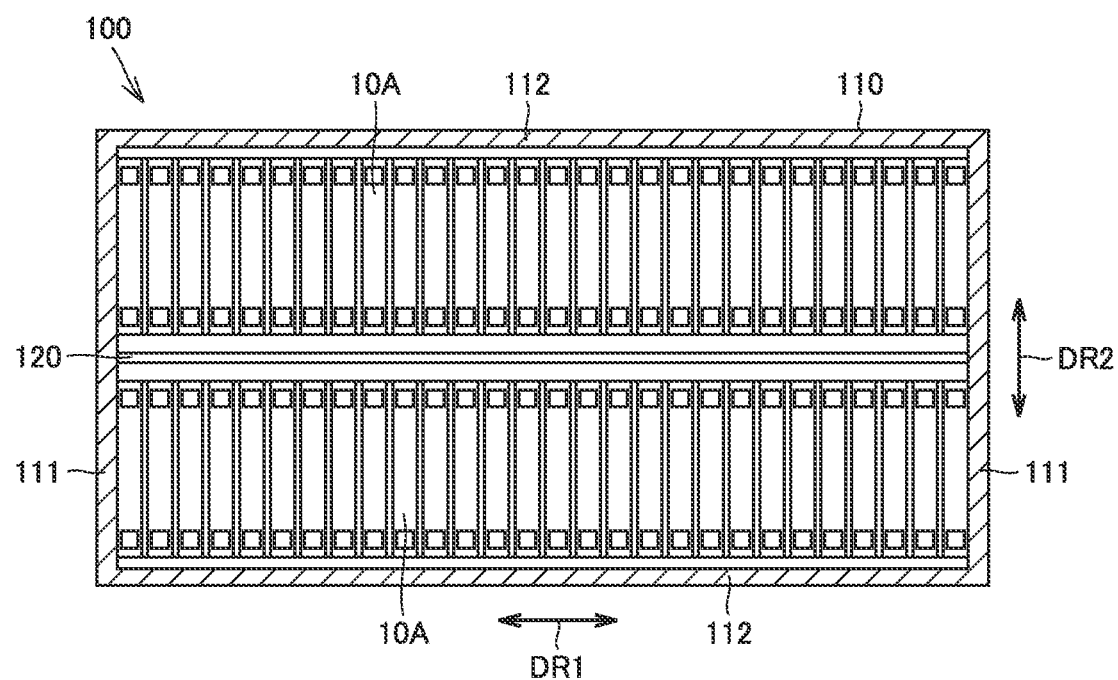
FIG. 4 is a top view showing a state in which battery cells are accommodated in the first case of the battery pack according to the first embodiment.
Figure 5:
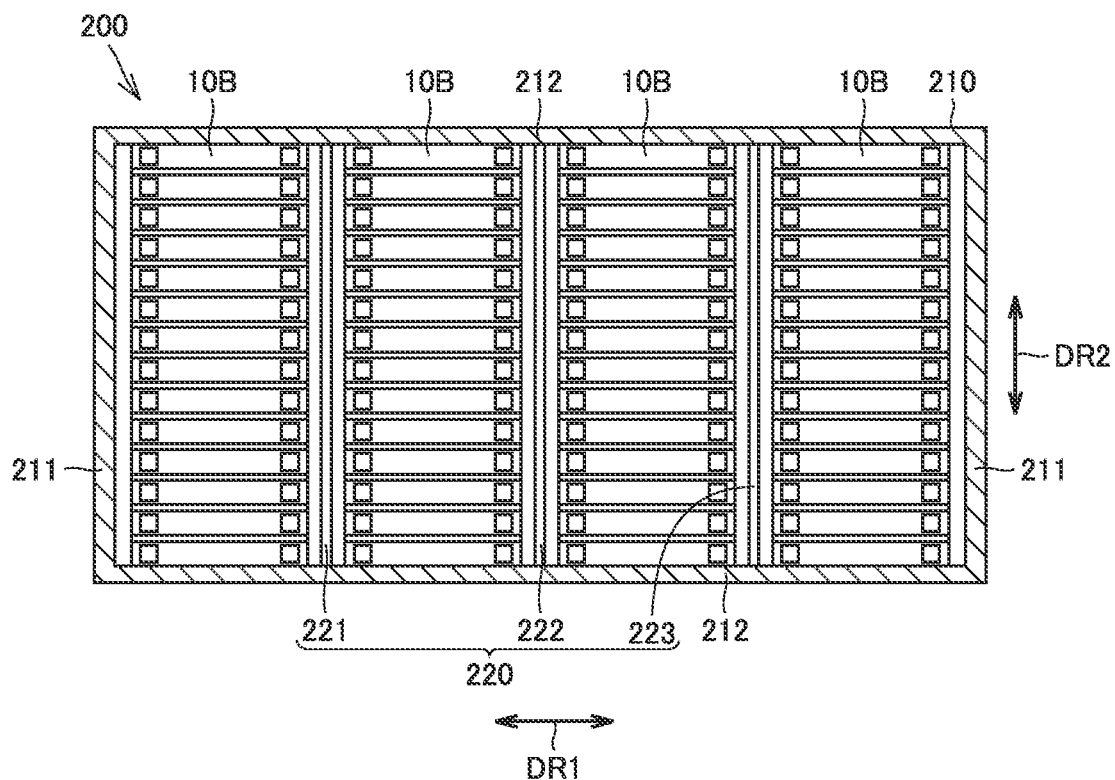
FIG. 5 is a top view showing a state in which battery cells are accommodated in the second case of the battery pack according to the first embodiment.

FIGS. 4 and 5 are top views respectively showing a state in which battery cells 10 are accommodated in first case 100 and a state in which battery cells 10 are accommodated in second case 200.

As shown in FIG. 4, first case 100 accommodates a plurality of stacked battery cells 10A (first power storage cells). Main body 110 of first case 100 has: first wall surfaces 111 located at both ends in the DR1 direction; and second wall surfaces 112 located at both ends in the DR2 direction.

Battery cells 10A at the end portions are directly supported by first wall surfaces 111 (wall portions) of first case 100.

As shown in FIG. 5, second case 200 accommodates a plurality of stacked battery cells 10B (second power storage cells). Main body 210 of second case 200 has: first wall surfaces 211 located at both ends in the DR1 direction; and second wall surfaces 212 located at both ends in the DR2 direction. Battery cells 10B at the end portions are directly supported by second wall surfaces 212 (wall portions) of second case 200.

Thus, in the present embodiment, the stacking direction of battery cells 10 (10A, 10B) and the extending direction of rib 120, 220 are the same.

Figure 6:
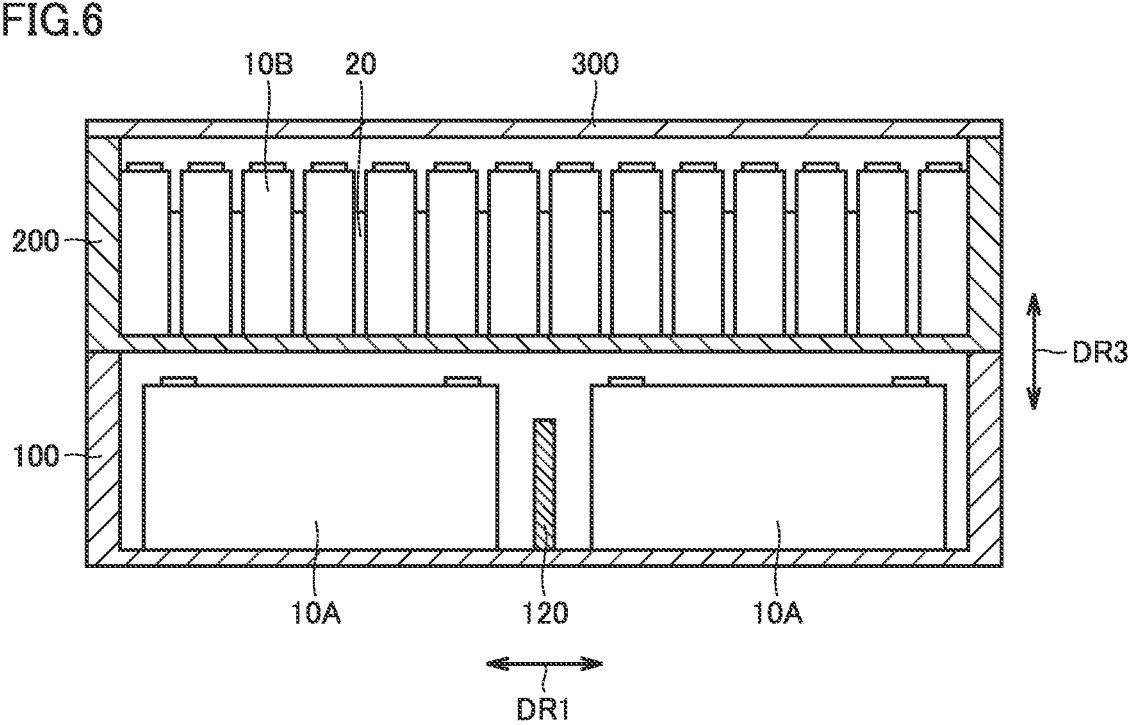
FIG. 6 is a cross sectional view of the battery pack according to the first embodiment.

FIG. 6 is a cross sectional view of the battery pack according to the present embodiment. As shown in FIG. 6, first case 100 and second case 200 are provided to overlap with each other along a DR3 direction (third direction) intersecting the DR1 direction and the DR2 direction. A separator 20 having an insulating property is provided between the plurality of battery cells 10 (10A, 10B).

First case 100 and second case 200 provided to overlap with each other are joined to each other. As a typical example, first case 100 and second case 200 are joined to each other by welding, but the manner of joining first case 100 and second case 200 to each other is not limited to the welding. In addition to first case 100 and second case 200, other case(s) may be further provided to overlap therewith.

The battery pack according to the present embodiment has a structure in which first case 100 having rib 120 extending in the DR1 direction and second case 200 having rib 220 extending in the DR2 direction are joined to each other. In this structure, rigidity in the DR1 direction can be improved by rib 120 and rigidity in the DR2 direction can be improved by rib 220. Therefore, even though each of the cases is only provided with the rib (rib 120 or rib 220) extending in one direction (DR1 direction or DR2 direction), vibration resistance in the two directions (DR1 direction and DR2 direction) orthogonal to each other can be improved. As a result, efficiency of accommodating battery cells 10 can be improved, and vibration resistance of the battery pack can be improved while attaining improved energy density and reduced size.

Second Embodiment

Figure 7:
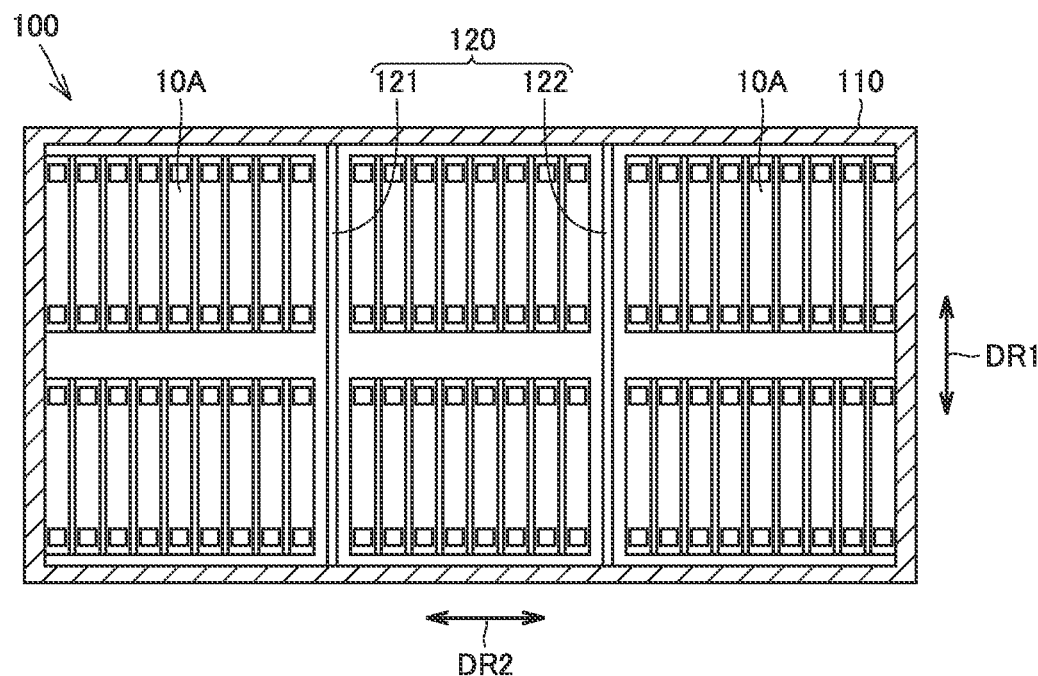
FIG. 7 is a top view showing a state in which battery cells are accommodated in a first case of a battery pack according to a second embodiment.
Figure 8:
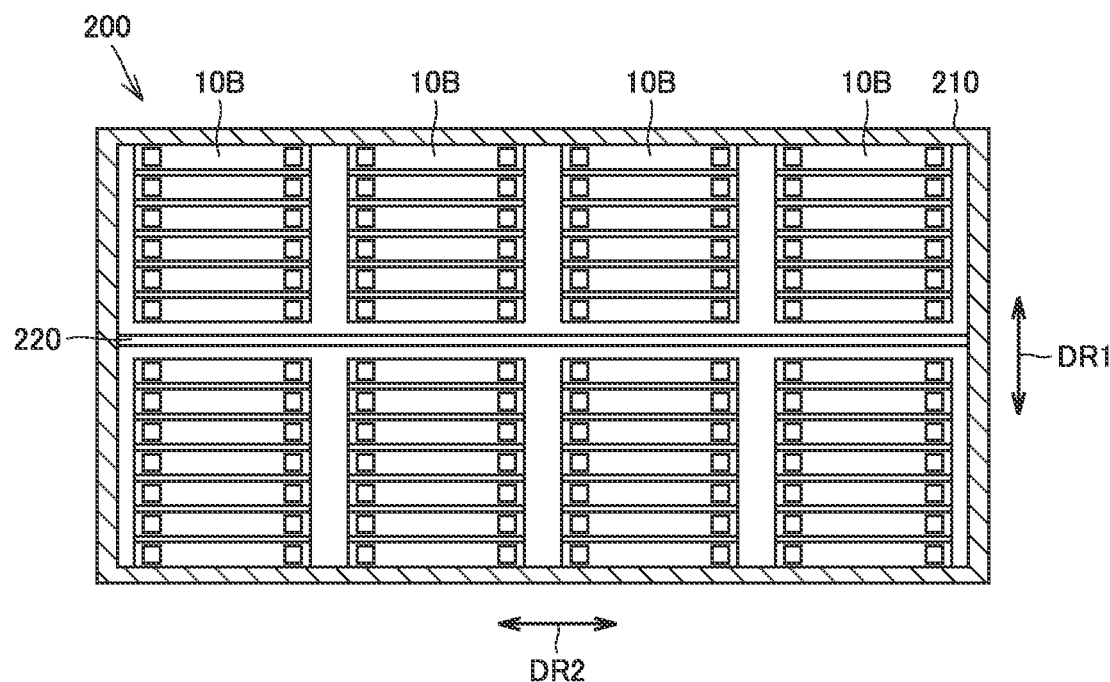
FIG. 8 is a top view showing a state in which battery cells are accommodated in a second case of the battery pack according to the second embodiment.

FIGS. 7 and 8 are top views respectively showing a state in which battery cells 10 are accommodated in a first case 100 of a battery pack according to a second embodiment and a state in which battery cells 10 are accommodated in a second case 200 of the battery pack according to the second embodiment.

As shown in FIG. 7, first case 100 has a main body 110 and a rib 120 (first reinforcement portion) extending in the DR1 direction (first direction). First case 100 accommodates a plurality of battery cells 10A. (first power storage cells) stacked in the DR2 direction.

As shown in FIG. 8, second case 200 includes a main body 210 and a rib 220 (second reinforcement portion) extending in the DR2 direction (second direction), Second case 200 accommodates a plurality of battery cells 10B (second power storage cells) stacked in the DR1 direction.

Thus, in the present embodiment, the stacking direction of battery cells 10 (10A, 10B) and the extending direction of rib 120, 220 are substantially orthogonal to each other.

Also in the present embodiment, (referring, for example, to FIGS. 7 and 8) as with the first embodiment, rigidity in the DR1 direction can be improved by rib 120 (ribs 121, 122)

and rigidity in the DR2 direction can be improved by rib 220. Therefore, even though each of the cases is only provided with the rib (rib 120 or rib 220) extending in one direction (DR1 direction or DR2 direction), vibration resistance in the two directions (DR1 direction and DR2 direction) orthogonal to each other can be improved. As a result, efficiency of accommodating battery cells 10 can be improved, and the vibration resistance of the battery pack can be improved while attaining improved energy density and reduced size.

Third Embodiment

Figure 9:
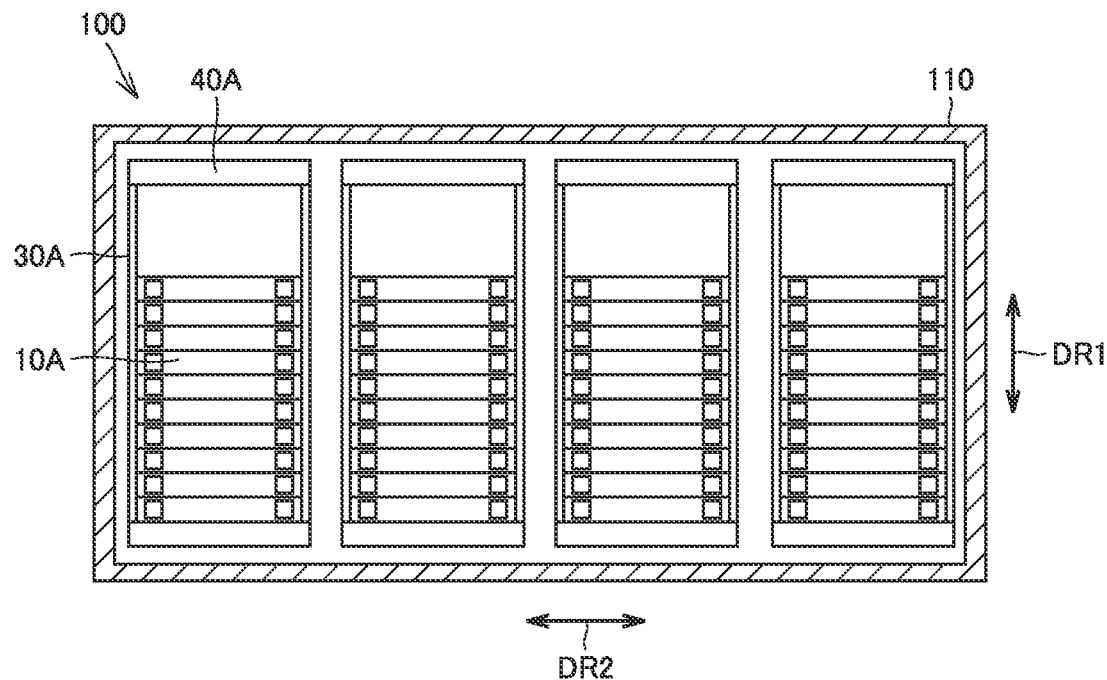
FIG. 9 is a top view showing a state in which battery cells are accommodated in a first case of a battery pack according to a third embodiment.
Figure 10:
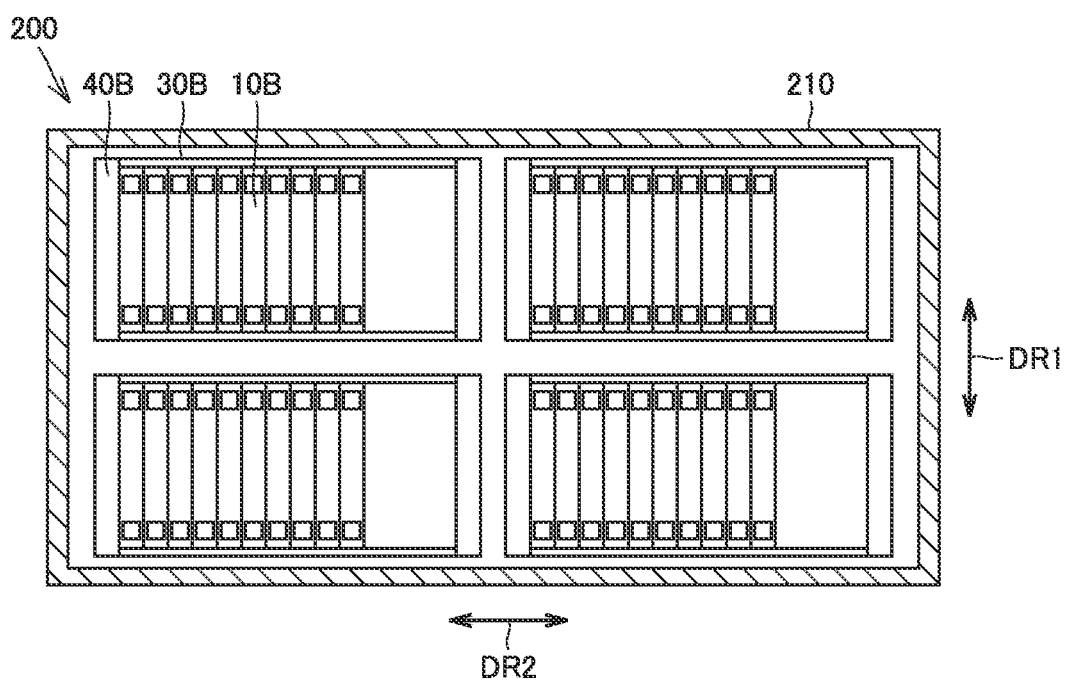
FIG. 10 is a top view showing a state in which battery cells are accommodated in a second case of the battery pack according to the third embodiment.
Each of FIGS. 11 and 12 is a partial enlarged view of the case and the battery cells.
Each of FIGS. 13 to 15 is a diagram showing an exemplary structure of joining of the first case and the second case.

FIGS. 9 and 10 are top views respectively showing a state in which battery cells 10 are accommodated in a first case 100 of a battery pack according to a third embodiment and a state in which battery cells 10 are accommodated in a second case 200 of the battery pack according to the third embodiment.

As shown in FIGS. 9 and 10, the battery pack according to the present embodiment includes: a restraint member 30A (first restraint member) that restrains a plurality of battery cells 10A along the DR1 direction; and a restraint member 30B (second restraint member) that restrains a plurality of battery cells 10B along the DR2 direction. Restraint member 30A is fixed to end plates 40A provided at the both ends of the stack of the plurality of battery cells 10A, and restraint member 30B is fixed to end plates 40B provided at the both ends of the stack of the plurality of battery cells 10B.

When manufacturing a battery pack including restraint members 30A, 30B and end plates 40A, 40B, the plurality of battery cells 10A, 10B are first stacked along the Y axis direction. Next, end plates 40A are provided at both ends of the stack of the plurality of battery cells 10A, and end plates 40B are provided at both ends of the stack of the plurality of battery cells 10B. The plurality of battery cells 10 and end plates 40A, 40B are restrained in the Y axis direction by restraint members 30A, 30B. The battery pack thus configured is fixed to the inside of first case 100 and second case 200.

In the present embodiment, ribs 120, 220 described in the first and second embodiments are not provided. However, restraint member 30A extending in the DR1 direction can function as the "first reinforcement portion" in a manner similar to rib 120. Moreover, restraint member 30B extending in the DR2 direction functions as the "second reinforcement portion" in a manner similar to rib 220. Therefore, vibration resistance in the two directions (DIU direction and DR2 direction) orthogonal to each other can be improved without providing ribs 120, 220. As a result, efficiency of accommodating battery cells 10 can be improved, and vibration resistance of the battery pack can be improved while attaining improved energy density and reduced size.

(Shape of Case)

FIGS. 11 and 12 are partial enlarged views of the case and the battery cells.

In an example of FIG. 11, the thickness (T1) of first wall surface 111 that directly supports battery cells 10 is larger than the thickness (T2) of second wall surface 112. In this way, the strength of first wall surface 111, which receives reaction force from battery cells 10, can be improved.

In an example of FIG. 12, cavities 113 are formed in first wall surface 111 that directly supports battery cells 10. In this way, heat generated when joining first case 100 and second case 200 to each other by welding is less likely to be transferred to battery cells 10, with the result that an influence of heat on battery cells 10 can be reduced.

(Structure of Joining of Cases)

FIGS. 13 to 22 are diagrams each showing an exemplary structure of joining of first case 100 and second case 200.

Figure 13:
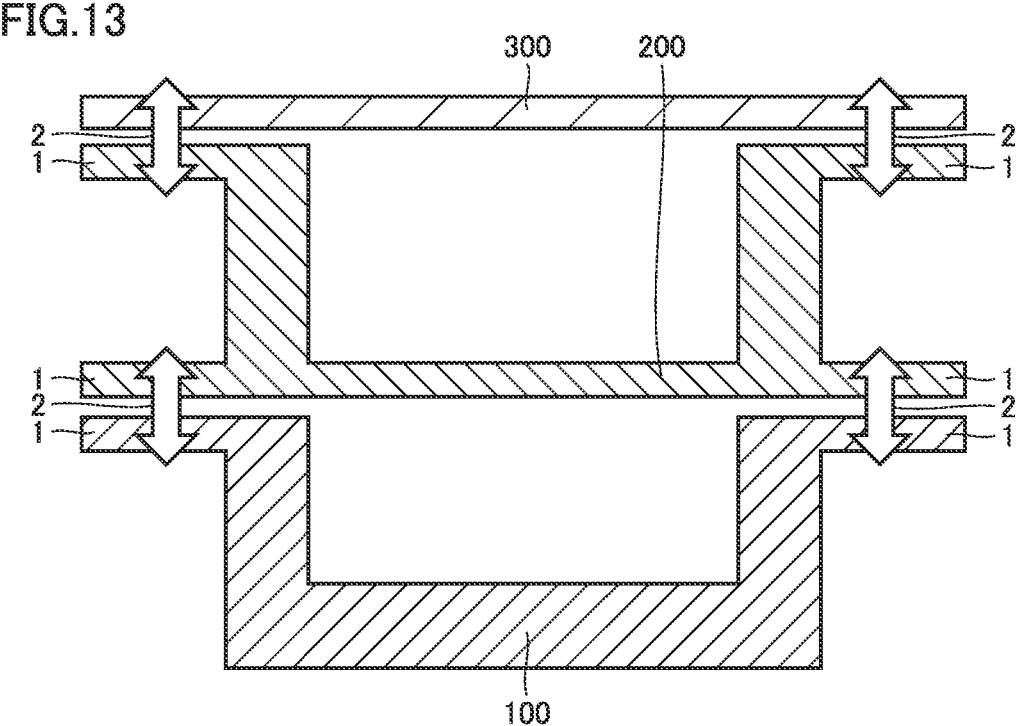

In an example of FIG. 13, each of first case 100 and second case 200 has a flange portion 1 protruding toward outside of a corresponding one of first case 100 and second case 200. Flange portions 1 are joined by a bolt fastening portion 2 or flange portion 1 and an upper cover 300 are joined by a bolt fastening portion 2.

Figure 14:
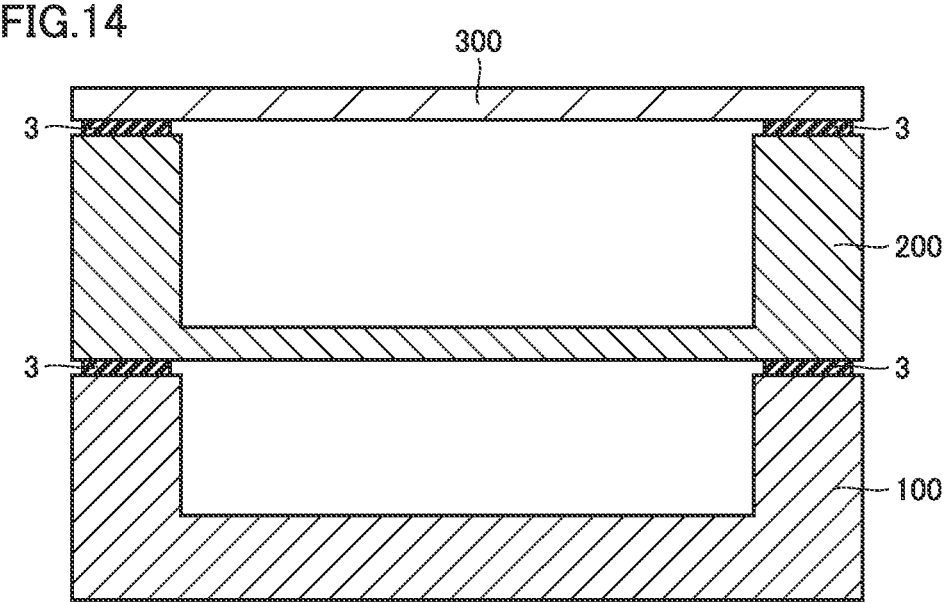

In an example of FIG. 14, first case 100, second case 200, and upper cover 300 are joined by an adhesion portion 3.

Figure 15:
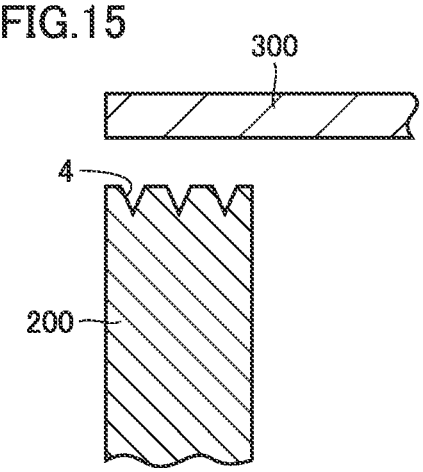
Figure 16:
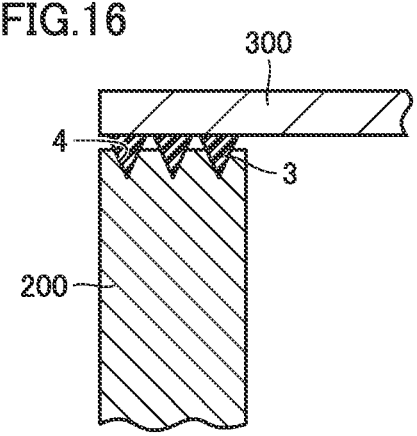
FIG. 16 is a diagram showing a state in which an adhesion portion is provided in the structure of joining shown in FIG. 15.

Also in an example of FIGS. 15 and 16, second case 200 and upper cover 300 are joined by an adhesion portion 3, Here, the end surface of second case 200 on which adhesion portion 3 is to be formed has an irregularity portion 4.

Figure 17:
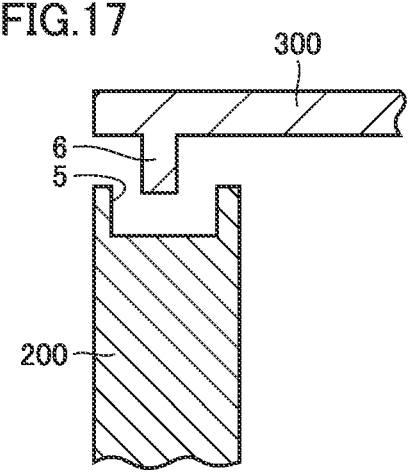
FIG. 17 is a diagram showing another exemplary structure of joining of the first case and the second case.
Figure 18:
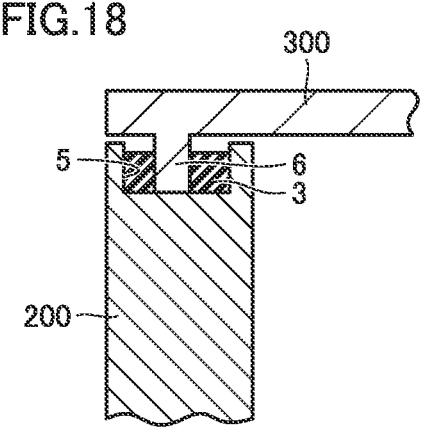
FIG. 18 is a diagram showing a state in which an adhesion portion is provided in the structure of joining shown in FIG. 17.
Each of FIGS. 19 to 22 is a diagram showing still another exemplary structure of joining of the first case and the second case.

Also in an example of FIGS. 17 and 18, second case 200 and upper cover 300 are joined by an adhesion portion 3. Here, the end surface of second case 200 on which adhesion portion 3 is to be formed is provided with a recess 5. A protrusion 6 is formed in upper cover 300 at a position facing recess 5. Protrusion 6 is accommodated in recess 5.

By providing the irregularity portion in the joining surface between second case 200 and upper cover 300 as in the examples of FIGS. 15 to 18, an adhesive agent securely remains on the joining surface, thereby securing adhesion strength. Further, an adhesion area is increased due to the irregularity portion, thereby improving the adhesion strength.

The irregularity structures shown in FIGS. 15 to 18 may be applied to a joining, surface between first case 100 and second case 200.

Figure 19:
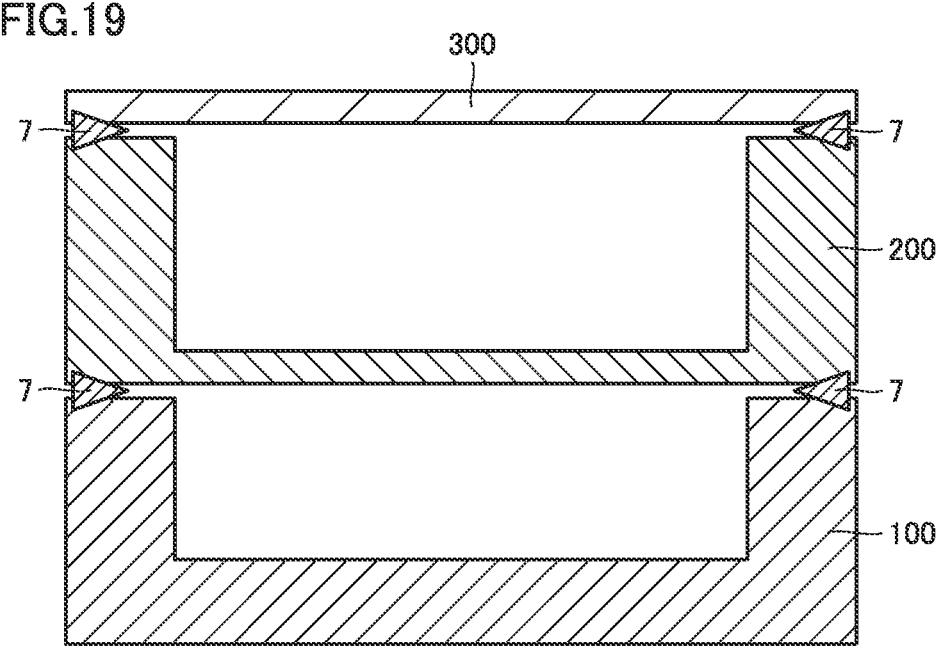

In an example of FIG. 19, first case 100, second case 200, and upper cover 300 are joined by a welding portion 7.

Figure 20:
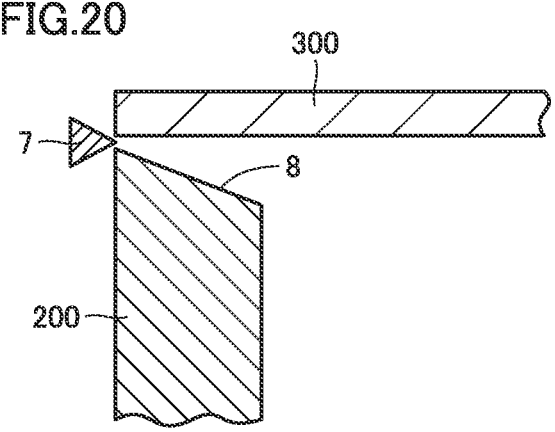

Also in an example of FIG. 20, second case 200 and upper cover 300 are joined by a welding portion 7. Here, the end surface of second case 200 on which welding portion 7 is to be formed has an inclined surface 8. Inclined surface 8 is inclined to be further away from the lower surface (opposing surface) of upper cover 300 in a direction from the outer side to inner side of second case 200, Welding portion 7 is formed on the tip side of inclined surface 8, that is, on the outer side of second case 200. In this way, second case 200 in which welding portion 7 is to be formed can be brought close to upper cover 300, so that welding can be securely performed.

Inclined surface S shown in FIG. 20 may be applied to the joining surface between first case 100 and second case 200.

Figure 21:
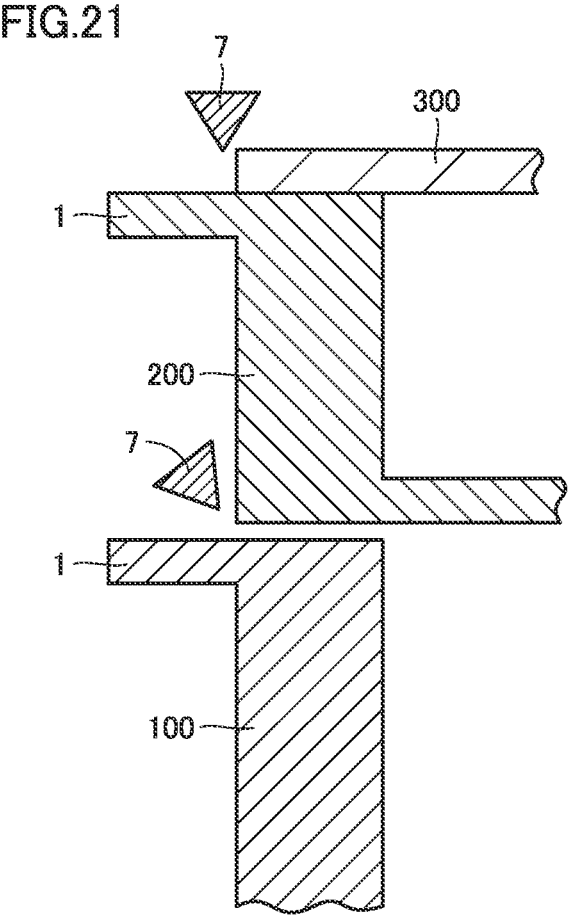

Also in an example of FIG. 21, first case 100, second case 200, and upper cover 300 are joined by welding portions 7. Welding portions 7 are formed on flange portions 1 of first case 100 and second case 200.

As shown in FIG. 21, by forming flange portion 1 in the member located on the lower side, welding portion 7 can be formed on the upper side, thereby improving workability in welding.

Figure 22:
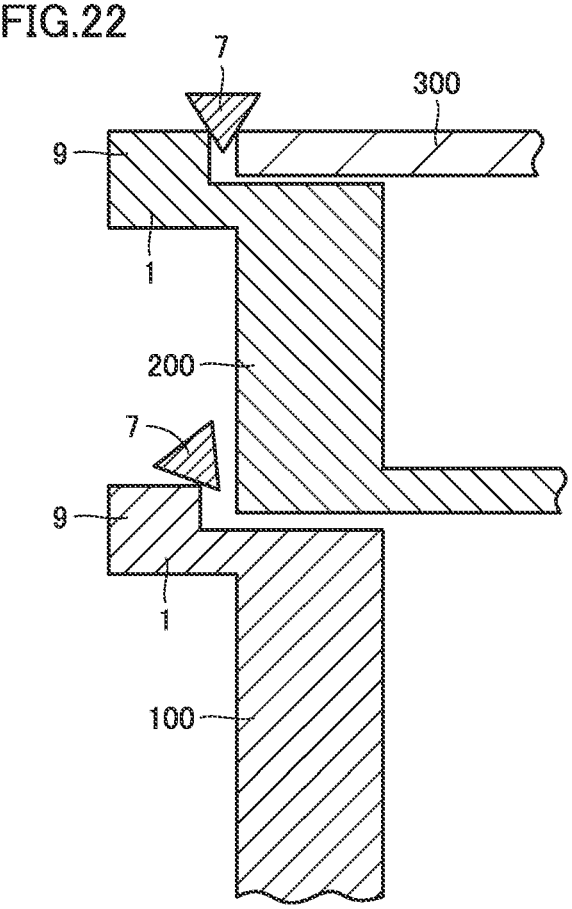

Also in an example of FIG. 22, welding portions 7 are formed in flange portions 1, A stepped portion 9 is formed in each of flange portions 1. With stepped portion 9, a member to be welded can be positioned.

(Manufacturing Process)

Figure 23:
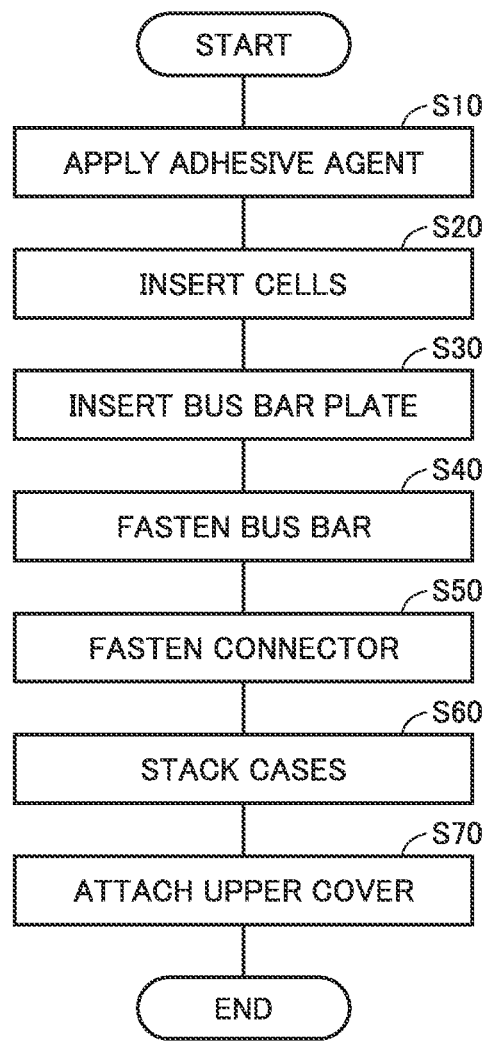
FIG. 23 is a flowchart showing a process of manufacturing the battery pack.
Each of FIGS. 24 to 26 is a diagram for illustrating the flowchart of FIG. 23.
Figure 24:
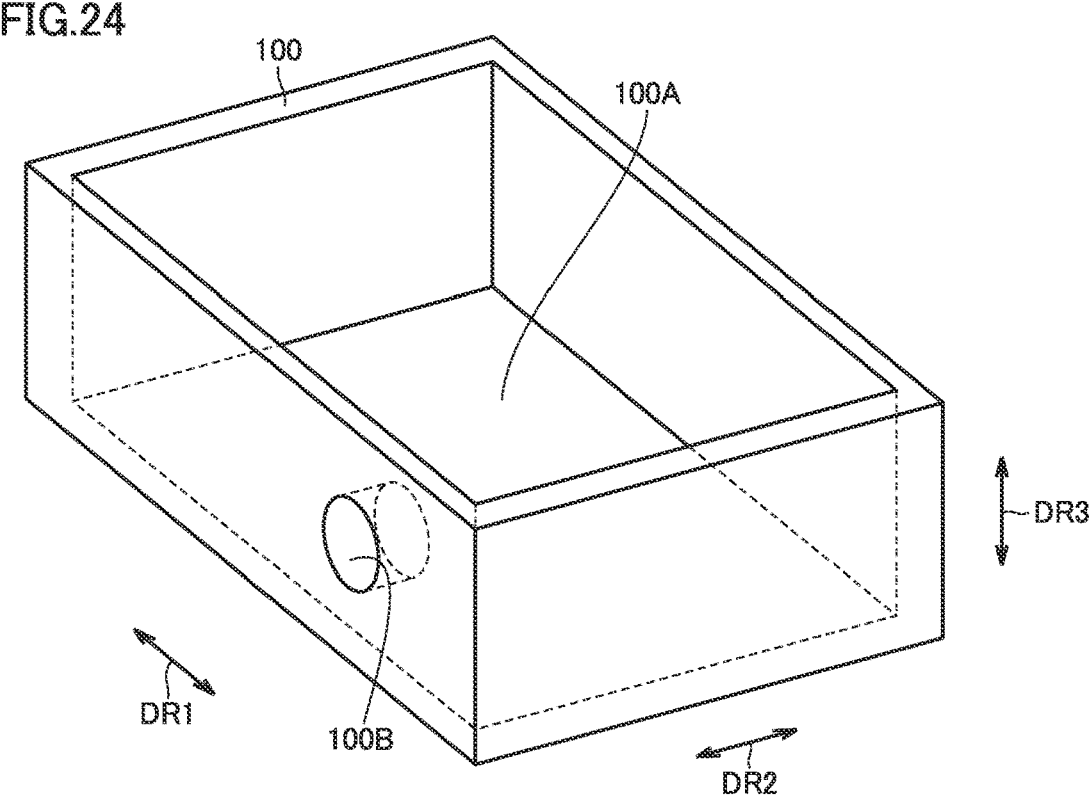
Figure 25:
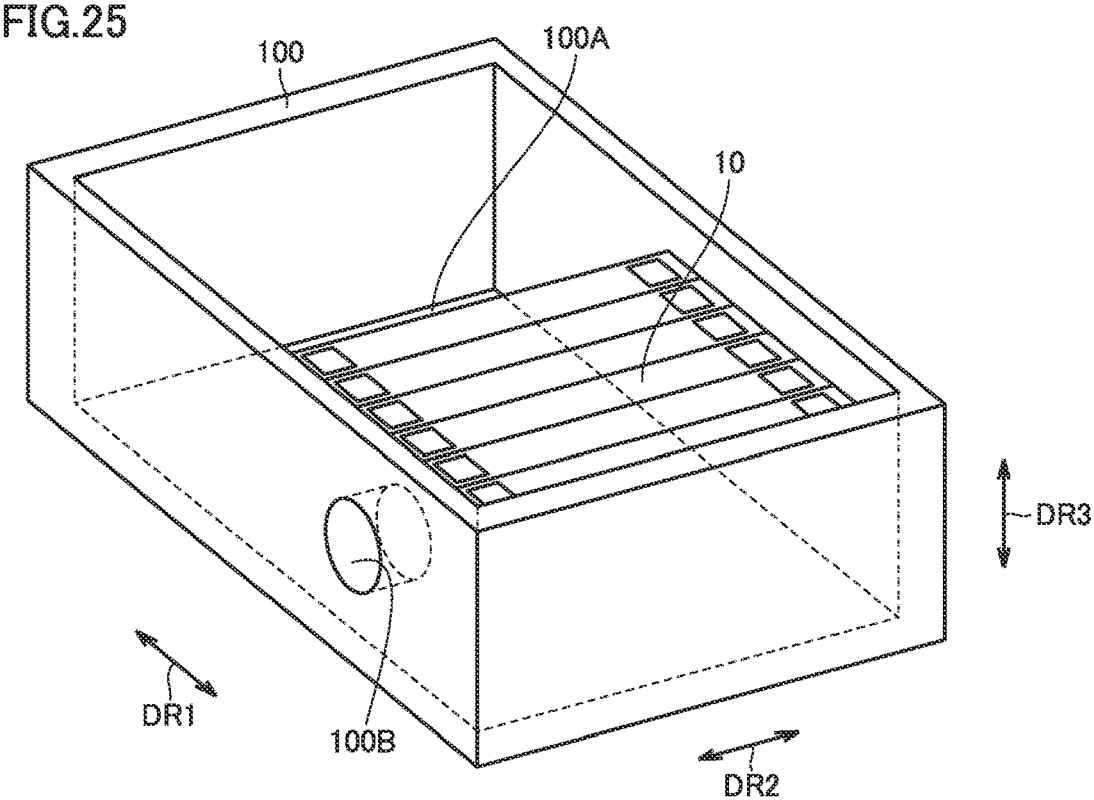
Figure 26:
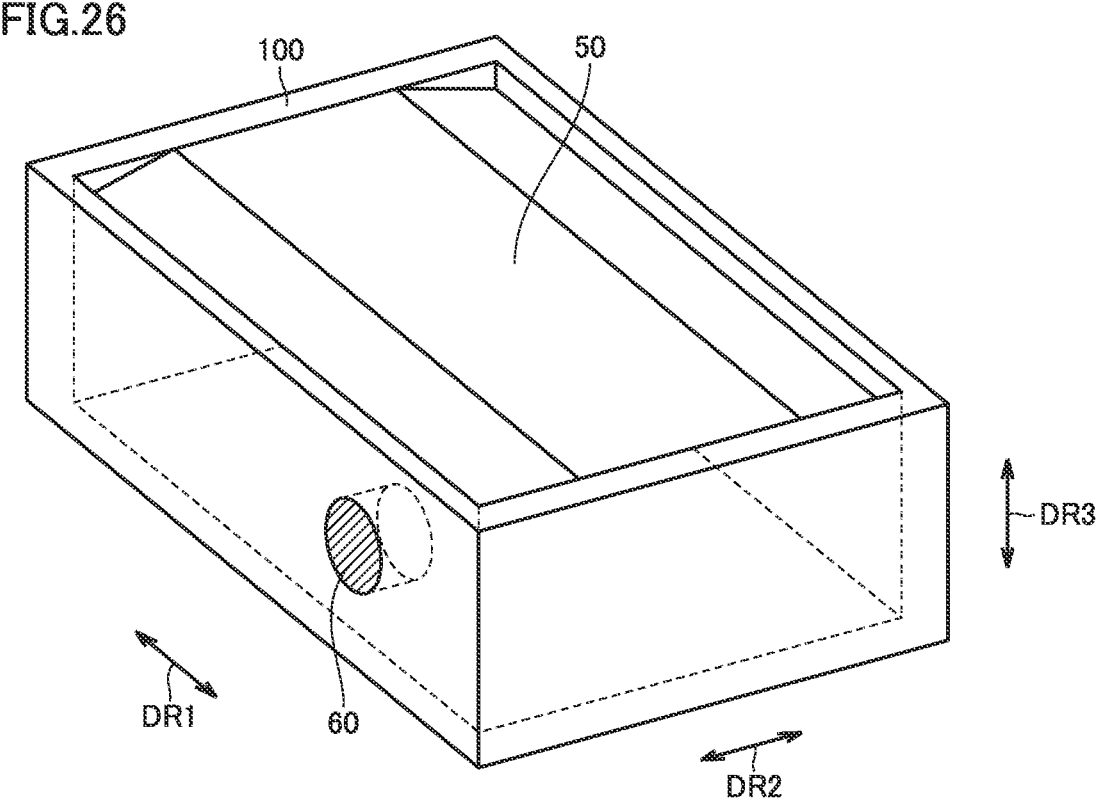

FIG. 23 is a flowchart showing a process of manufacturing the battery pack. FIGS. 24 to 26 are diagrams showing respective states in steps in FIG. 23. It should be noted that only first case 100 is shown in FIGS. 24 to 26 for convenience of illustration and description; however, the same applies to second case 200.

As shown in FIGS. 23 to 26, the process of manufacturing the battery pack includes: a step (S10: FIG. 24) of applying an adhesive agent to bottom surface 100A of first case 100; a step (S20: FIG. 25) of inserting battery cells 10 into first case 100; a step (S30: FIG. 26) of inserting, on battery cells 10, a bus bar plate 50 to which a bus bar and a voltage detection wire are attached; a step (S40) of fastening electrode terminals of battery cells 10 and the bus bar; a step (S50: FIG. 26) of fastening a connector 60 for external connection; a step (S60) of stacking and fixing first case 100 and second case 200 on each other; and a step (S70) of attaching upper cover 300.

As shown in FIGS. 24 and 25, a hole portion 100B for providing connector 60 opens in a direction perpendicular to the stacking direction (Y axis direction) of battery cells 10.

(Mounting on Vehicle)

The battery pack described above can be mounted on a vehicle. On this occasion, for example, the DR1 direction can be the frontward/rearward direction of the vehicle, and the DR2 direction can be the width direction of the vehicle. In this way, a vehicle-mounted structure can be obtained to have high vibration resistance in the frontward/rearward direction and width direction of the vehicle.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A power storage device comprising:
   a first case that accommodates a plurality of stacked first power storage cells; and
   a second case that accommodates a plurality of stacked second power storage cells, wherein
   the first case has a first reinforcement portion extending in a first direction,
   the second case has a second reinforcement portion extending in a second direction intersecting the first direction,
   the first case and the second case are provided to overlap with each other along a third direction intersecting the first direction and the second direction, and are joined to each other,
   the first case has a first bottom surface, and the first reinforcement portion protrudes from the first bottom surface in the third direction,
   the second case has a second bottom surface, and the second reinforcement portion protrudes from the second bottom surface in the third direction,
   the plurality of stacked first power storage cells are provided on both sides of the first reinforcement portion in the second direction, and
   the plurality of stacked second power storage cells are provided on both sides of the second reinforcement portion in the first direction.

2. The power storage device according to claim 1, wherein the first direction and the second direction are orthogonal to each other.

3. The power storage device according to claim 1, wherein the first reinforcement portion extends along the first direction across a whole of the first case in a width direction of the first case, and
the second reinforcement portion extends along the second direction across a whole of the second case in a width direction of the second case.

4. The power storage device according to claim 1, wherein the plurality of first power storage cells are directly supported by a wall portion of the first case, and
the plurality of second power storage cells are directly supported by a wall portion of the second case.

5. The power storage device according to claim 1, further comprising:
   a first restraint member that restrains the plurality of first power storage cells along the first direction; and
   a second restraint member that restrains the plurality of second power storage cells along the second direction, wherein
   the first reinforcement portion includes the first restraint member, and
   the second reinforcement portion includes the second restraint member.

6. The power storage device according to claim 1, wherein the first case and the second case are joined to each other by welding.

7. The power storage device according to claim 1, wherein at least one of the first case and the second case has an end surface including an irregularity portion, and
the first case and the second case are joined to each other by an adhesion portion formed on the end surface.

8. The power storage device according to claim 1, wherein at least one of the first case and the second case has an end surface including an inclined surface, and
a welding portion is formed on a tip side of the inclined surface.

9. The power storage device according to claim 1, wherein at least one of the first case and the second case has a flange portion protruding toward outside of the first case and the second case, and
a welding portion is formed in the flange portion.

10. The power storage device according to claim 9, wherein the flange portion includes a stepped portion.

11. A vehicle-mounted structure in which the power storage device according to claim 1 is mounted on a vehicle, wherein the first direction is a frontward/rearward direction of the vehicle and the second direction is a width direction of the vehicle.

12. A power storage device, comprising:
    a first case that accommodates a plurality of stacked first power storage cells; and
    a second case that accommodates a plurality of stacked second power storage cells, wherein
    the first case has a first reinforcement portion extending in a first direction,
    the second case has a second reinforcement portion extending in a second direction intersecting the first direction,
    the first case and the second case are provided to overlap with each other along a third direction intersecting the first direction and the second direction, and are joined to each other,
    the first case has a first bottom surface, and the first reinforcement portion protrudes from the first bottom surface in the third direction,
    the second case has a second bottom surface, and the second reinforcement portion protrudes from the second bottom surface in the third direction,
    a stacking direction of the plurality of stacked first power storage cells and the extending direction of the first reinforcement portion are the same, and a stacking direction of the plurality of stacked second power storage cells and the extending direction of the second reinforcement portion are the same.

13. A power storage device, comprising:

a first case that accommodates a plurality of stacked first power storage cells; and a second case that accommodates a plurality of stacked second power storage cells, wherein the first case has a first reinforcement portion extending in a first direction, the second case has a second reinforcement portion extending in a second direction intersecting the first direction, the first case and the second case are provided to overlap with each other along a third direction intersecting the first direction and the second direction, and are joined to each other, the first case has a first bottom surface, and the first reinforcement portion protrudes from the first bottom surface in the third direction, the second case has a second bottom surface, and the second reinforcement portion protrudes from the second bottom surface in the third direction, a stacking direction of the plurality of stacked first power storage cells and the extending direction of the first reinforcement portion are orthogonal to each other, and the stacking direction of the plurality of stacked second power storage cells and the extending direction of the second reinforcement portion are orthogonal to each other.

14. The power storage device according to claim 1, wherein a stacking direction of the first power storage cells in the first case is orthogonal to a stacking direction of the second power storage cells in the second case.

* * * * *